United States Patent
Pound et al.

(10) Patent No.: US 10,132,128 B2
(45) Date of Patent: Nov. 20, 2018

(54) METHODS AND SYSTEMS FOR FLUID REMOVAL FROM A STRUCTURE

(71) Applicant: SCHLUMBERGER TECHNOLOGY CORPORATION, Sugar Land, TX (US)

(72) Inventors: Andrea Pound, Katy, TX (US); Varma Gottumukkala, Missouri City, TX (US)

(73) Assignee: SCHLUMBERGER TECHNOLOGY CORPORATION, Sugar Land, TX (US)

(*) Notice: Subject to any disclaimer, the term of this patent is extended or adjusted under 35 U.S.C. 154(b) by 967 days.

(21) Appl. No.: 14/534,782

(22) Filed: Nov. 6, 2014

(65) Prior Publication Data

US 2016/0130893 A1 May 12, 2016

(51) Int. Cl.

| | | |
|---|---|---|
| *E21B 21/08* | (2006.01) | |
| *G05B 15/02* | (2006.01) | |
| *E21B 34/16* | (2006.01) | |
| *E21B 47/12* | (2012.01) | |
| *E21B 21/06* | (2006.01) | |
| *E21B 21/00* | (2006.01) | |
| *E21B 43/12* | (2006.01) | |
| *E21B 43/14* | (2006.01) | |

(Continued)

(52) U.S. Cl.
CPC .............. *E21B 21/08* (2013.01); *E21B 21/00* (2013.01); *E21B 21/06* (2013.01); *E21B 21/068* (2013.01); *E21B 34/16* (2013.01); *E21B 43/12* (2013.01); *E21B 43/14* (2013.01); *E21B 47/12* (2013.01); *G05B 15/02* (2013.01); *G05D 7/0635* (2013.01); *E21B 21/10* (2013.01); *E21B 37/00* (2013.01)

(58) Field of Classification Search
None
See application file for complete search history.

(56) References Cited

U.S. PATENT DOCUMENTS

| | | |
|---|---|---|
| 5,934,371 A | 8/1999 | Bussear et al. |
| 6,502,634 B1 | 1/2003 | Evans et al. |

(Continued)

FOREIGN PATENT DOCUMENTS

WO  2014160626 A1  10/2014

OTHER PUBLICATIONS

International Search Report and Written Opinion issued in related PCT application PCT/US2015/059161 dated Jan. 20, 2016, 16 pages.

(Continued)

*Primary Examiner* — Qing Yuan Wu

(57) ABSTRACT

Methods, computing systems, and computer-readable media for removing fluid from a structure. The system may include sensors disposed within the structure (such as a multi-lateral well) that measure properties of the fluid at the location of the sensors and generate data representing the properties. A computing system receives the data and, using the data, monitors the composition of the fluid at the locations of the sensors. The computing system also displays information about the composition of the fluid at the locations of the sensors. The computing system may, in response to a change in the composition, indicate that the removal process is complete for a particular section and stop the flow for that section.

10 Claims, 15 Drawing Sheets

(51) Int. Cl.
      *G05D 7/06*       (2006.01)
      *E21B 37/00*     (2006.01)
      *E21B 21/10*     (2006.01)

(56) References Cited

U.S. PATENT DOCUMENTS

| | | | |
|---|---|---|---|
| 8,393,207 B2 * | 3/2013 | Fujisawa | E21B 49/10 702/11 |
| 2009/0277650 A1 * | 11/2009 | Casciaro | E21B 21/103 166/386 |
| 2010/0206063 A1 | 8/2010 | Fujisawa et al. | |
| 2013/0168085 A1 | 7/2013 | Fraser | |

OTHER PUBLICATIONS

Montaron, et al., "Middle East and Asia Reservoir Review: Intelligent Completions", Nov. 8, 2007, 9 pages.

\* cited by examiner

METHODS AND SYSTEMS FOR FLUID REMOVAL FROM A STRUCTURE

BACKGROUND

Removing fluid from a structure can be challenging, particularly for large or complicated structures. For example, for an oil and gas well, drilling fluids may be introduced into the well during the drilling and completion process. This drilling fluid may deposit materials along the walls of the well, hindering production of hydrocarbons. As part of a cleanup process, before the production of hydrocarbons from the well begins, a team may introduce a treatment fluid to remove the deposits and recover the drilling fluid. Determining whether the drilling fluid has been removed from the well may not be simple, particularly with multi-lateral wells. An inefficient cleanup can cost a company time, money, and result in less recoverable reserves due to permanent damage to the formation.

SUMMARY

Embodiments of the present disclosure may provide methods, computing systems, and computer-readable media for removing fluid from a structure. In one embodiment, the method involves removing fluid from a structure and receiving real time data about the fluid composition at locations within the structure. Using the real time data, the fluid composition is monitored at the locations for changes in fluid composition. If a change in the fluid composition at a location is detected, the flow of the fluid may be reduced or stopped at that location.

In one embodiment, the approach is applied to a multi-section well. The method may involve, for a section of the multi-section well, recovering fluid from the section and monitoring the composition of the fluid at a location within that section. The method may also involve stopping recovery of the fluid from the first section if the composition of the fluid in the section changes. The method may also involve, for another section of the multi-section well, recovering the fluid from the second section while monitoring the composition of the fluid within the second section. If the composition of the fluid changes, recovery of the fluid from the second section is stopped.

A system may include sensors disposed within a well, where each sensor measures properties of the fluid at the location of the sensor and generates real time data representing the properties. The system may also include a communications module for communicating the real time data to a computing system. The computing system may include processors, a display, and memory. The computing system may receive real time data measured by the sensors and, using the real time data, monitor the composition of the fluid at the locations of the sensors. The computing system may also display, on the display, information about the composition of the fluid at the locations of the sensors.

In one embodiment, a computer-readable medium stores instructions executable by a processor. The instructions may cause a processor to perform operations that include receiving data about the composition of a fluid at a first location within a lateral of a multi-section well during a cleanup operation. The operations may also involve calculating the volume of fluid recovered from the lateral during the cleanup operation based on the data. The operations may include those for displaying a representation of the composition of the fluid based on the data and displaying the volume of fluid recovered from the lateral during the cleanup operation.

The foregoing summary is provided to introduce a selection of concepts that are further described below in the detailed description. This summary is not intended to be comprehensive, nor is it intended to be used as an aid in limiting the scope of the claimed subject matter.

BRIEF DESCRIPTION OF THE DRAWINGS

The accompanying drawings, which are incorporated in and constitute a part of this specification, illustrate embodiments of the present teachings and together with the description, serve to explain the principles of the present teachings. In the figures.

DETAILED DESCRIPTION

Figure 1:
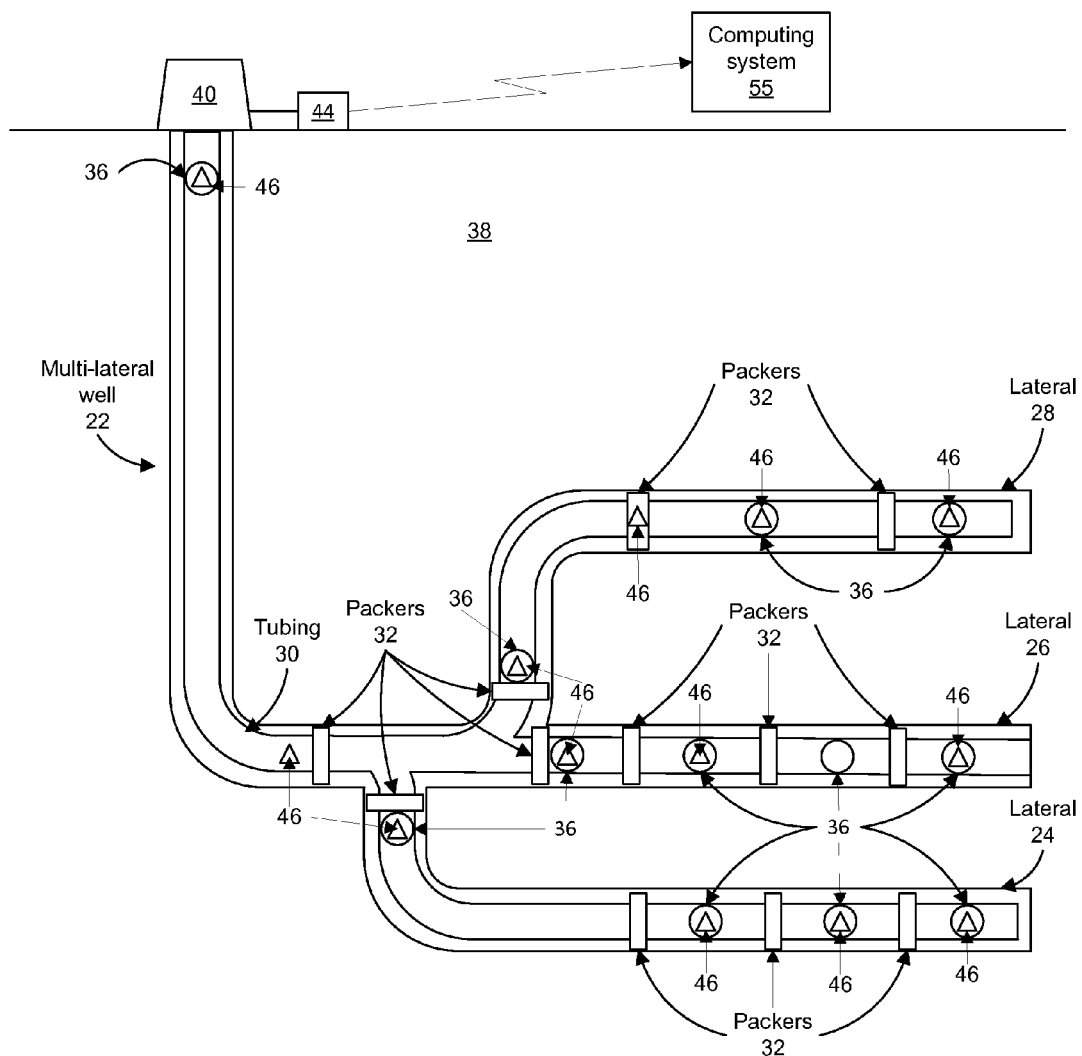
FIG. 1 illustrates a conceptual, schematic view of a multi-lateral well.

The following detailed description refers to the accompanying drawings. Wherever convenient, the same reference numbers are used in the drawings and the following description to refer to the same or similar parts. While several embodiments and features of the present disclosure are described herein, modifications, adaptations, and other implementations are possible, without departing from the spirit and scope of the present disclosure.

In general, embodiments of the present disclosure may provide systems, methods, and computer-readable media for removing fluids from a structure. FIG. 1 illustrates a multi-lateral well 22 with lateral bores 24, 26 and 28. FIG. 1 is simply one example of a multi-section well; other types of wells with multiple sections (including single lateral wells) may also use the approaches disclosed herein. Similarly, the approaches described herein may be applied to structures other than wells that may benefit from fluid removal.

In FIG. 1, the multi-lateral well 22 includes tubing 30 that extends between and/or through various completion components, including packers 32 that isolate sections of the tubing 30 for the multi-lateral well 22. The multi-lateral well 22 may also include flow control devices 36 that control fluid flow at various points in the multilateral well 22. The flow control devices 36 may be valves or other choking devices that can reduce, increase, or otherwise change the flow. In certain embodiments, the flow control devices 36 may control the flow for a particular section of the multi-lateral well 22. For example, a flow control device 36 may control the flow for one lateral. Where, as in FIG. 1, a lateral includes multiple flow control devices 36, the flow control device 36 may control the flow for the particular section of the lateral. The multi-lateral well 22 may also include components other than those shown in FIG. 1.

Fluid may flow from the surrounding formation 38 into the laterals 24, 26 and 28, through the flow control devices 36 at the respective sections. The fluid may commingle after flowing through the control valves 36, and the commingled fluid flow may be directed up through the tubing 30 to a wellhead 40 for collection. The wellhead 40 or other surface equipment may also include flow control devices 36 to control flow rates and pressures.

The multi-lateral well 22 may also include sensors 46. The sensors 46 are physical devices responsive to one or more physical properties and that generate a signal representing those physical properties. For example, a sensor may measure temperature, pressure, flow rate, capacitance, fluid composition, or other physical properties. In certain embodiments, the sensors 46 are integrated within components within the multi-lateral well 22 such as packers 32 and flow control devices 36. Sensors 46 may also be separate components placed within the multi-lateral well 22.

The sensors 46 may be configured to communicate measurements with a communications module 44. As used herein, a communications module 44 refers to a component capable of sending and/or receiving data. The sensors 46 generate data representing the properties. In one embodiment, the sensors 46 generate real time data representing the properties. The sensors 46 may include communications modules to send the data through a wired connection or through a wireless connection. The communications module 44 may receive the data from the sensors 46 and communicate the data with one or more computing systems such as computing system 55. The communications module 44 may also store the data and make the data available over a network such as a local area network (LAN), Internet, or other. The sensors 46 and the communications module 44 may be components within an intelligent completions system.

In certain embodiments, a hydrocarbon producer may wish to introduce a fluid into the multi-lateral well 22 and remove that fluid separately from hydrocarbons. For example, drilling mud may be used when drilling the multi-lateral well 22 in order to provide hydrostatic pressure, lubrication, lift cuttings, and prevent blow outs. The hydrocarbon producer may wish to recover the drilling mud from the multi-lateral well before beginning production of hydrocarbons from the multi-lateral well. The hydrocarbon producer may initiate a clean-up process to remove filter cake and flow back drilling fluids.

The computing system 55 may receive data measured by the sensors 46. In certain embodiments, the data is real time data measured by the sensors 46. In other embodiments, the data is near real time. In embodiments where the data is real time, the computing system 55 may display a dynamic, real time representation of the composition of the fluid at the locations of the sensors 46. The computing system 55 may also display information about the volume of fluid recovered during the cleanup process. As the composition of the fluid and the volume changes, the display may be dynamically updated to reflect the changes in the data. Such information may allow the user to make informed decisions about the progress of the cleanup operation. The computing system 55 may also provide recommendations (e.g., stopping the flow at a particular valve) based on the data received from the sensors 46.

Figure 2:
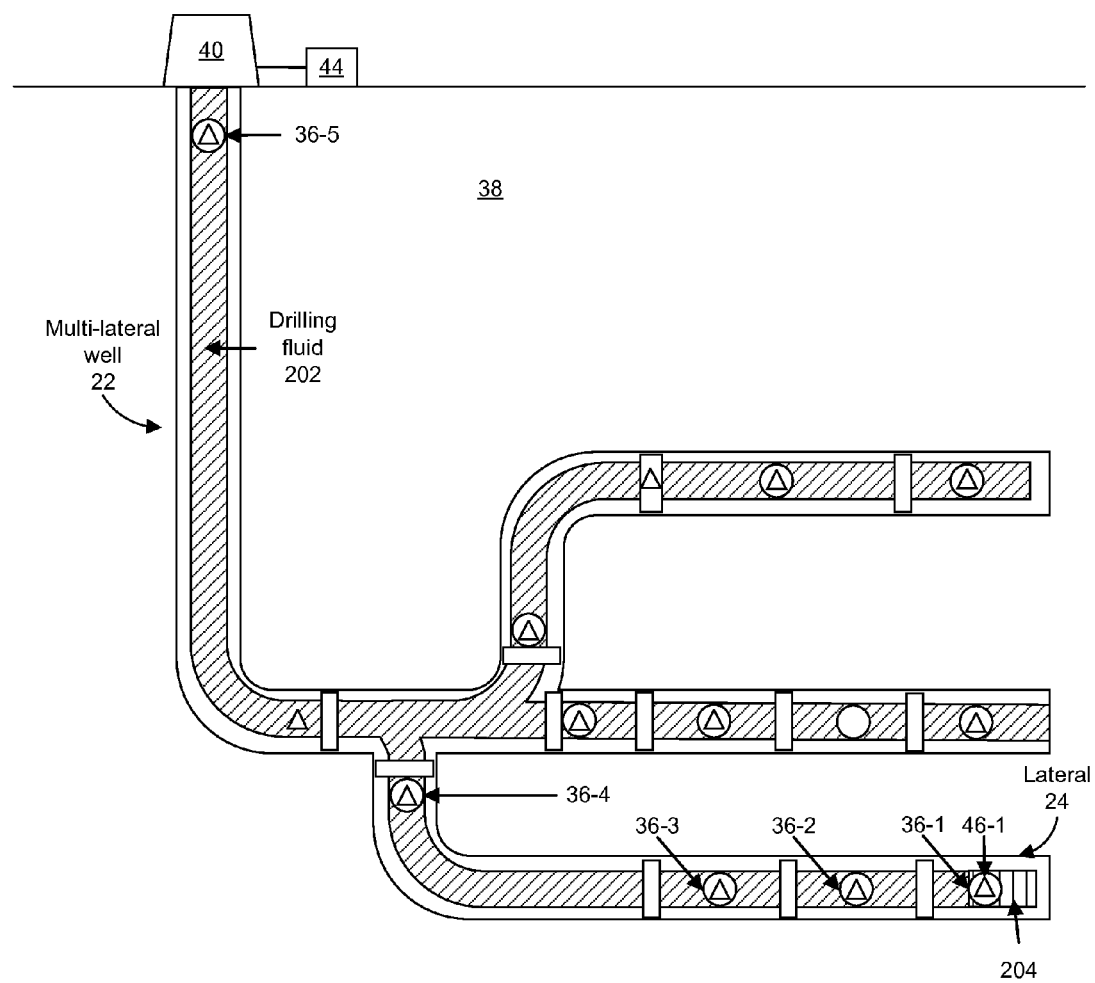
FIG. 2 illustrates a conceptual, schematic view of a multi-lateral well comprising drilling fluid during a cleanup operation.

FIG. 2 illustrates an example of the multi-lateral well 22 containing a first fluid and a second fluid. The hydrocarbon company may wish to produce the first fluid (in this example, drilling fluid 202) separately from a second fluid (in this example, production fluid 204). While FIG. 2 shows an example with drilling fluid 202 and production fluid 204, the approaches described in this application may be used in connection with other fluids.

Initially, the multi-lateral well 22 may contain the drilling fluid 202. The drilling fluid 202 may be recovered on a section-by-section basis. The section may be a lateral of the multi-lateral well, a section within a lateral, a section of a unilateral well, or other. During the cleanup operation, the flow control devices 36 in the multi-lateral well 22 may be closed such that fluid does not flow through them, with the exception of the flow control devices in the path connecting the section to the surface through which the fluid is removed.

In FIG. 2, for example, the cleanup process beings with lateral 24. The flow control devices 36-1, 36-2, 36-3, 36-4, and 36-5 may be open to allow flow while other flow control devices are closed. The sensors for the flow control devices 36-1, 36-2, 36-3, 36-4, and 36-5 may monitor the composition of the fluid at the locations of the sensors. The sensors may generate data representing the composition of the fluid, including, but not limited to, real time data. At the stage of the cleanup represented in FIG. 2, the sensor 46-1 associated with flow control device 36-1 may generate data indicating that the composition of the fluid has changed from drilling fluid 202 to production fluid 204.

Figure 3:
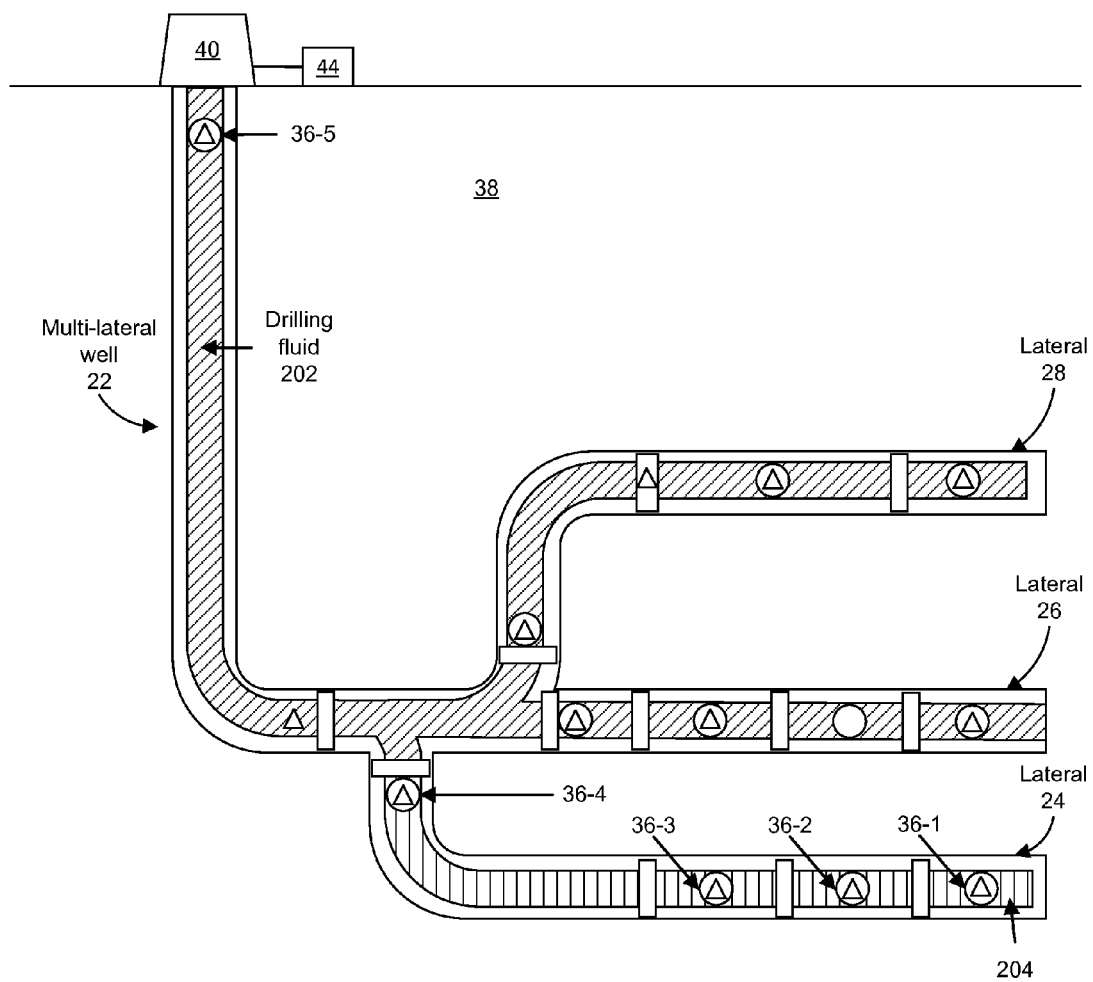
FIG. 3 illustrates a conceptual, schematic view of the multi-lateral well with the cleanup operation for a first lateral complete.

FIG. 3 continues the example of FIG. 2. In FIG. 3, drilling fluid 202 is recovered from the lateral 24. A the drilling fluid 202 moves through the lateral 24 the sensors associated with the flow control devices 36-4, 36-3, and 36-2 generate data about the composition of the fluid. This data may be generated in real time and presented to a user, allowing the user to view a real time, dynamic representation of the cleanup operation. Based on the data, the user may conclude, once the sensor for flow control device 36-4 indicates a transition from drilling fluid 202 to production fluid 204, that the drilling fluid 202 has been removed from the lateral 24. In other embodiments, a computing device may monitor the data and automatically determine that the drilling fluid 202 has been removed from the lateral 24.

The recovery of the fluid from the lateral 24 may be stopped in response to the change in the composition of the fluid for the lateral 24. The recovery may be stopped by closing one or more of the flow control devices 36-4, 36-3, 36-2, and 36-1. In one embodiment, the flow control device 36-4 is closed. The command to close the flow control device 36-4 may be sent from a computing device. The command may be initiated by a user participating in the cleanup operation. In certain embodiments, the computing device may automatically initiate the command based on data from the sensors.

Figure 4:
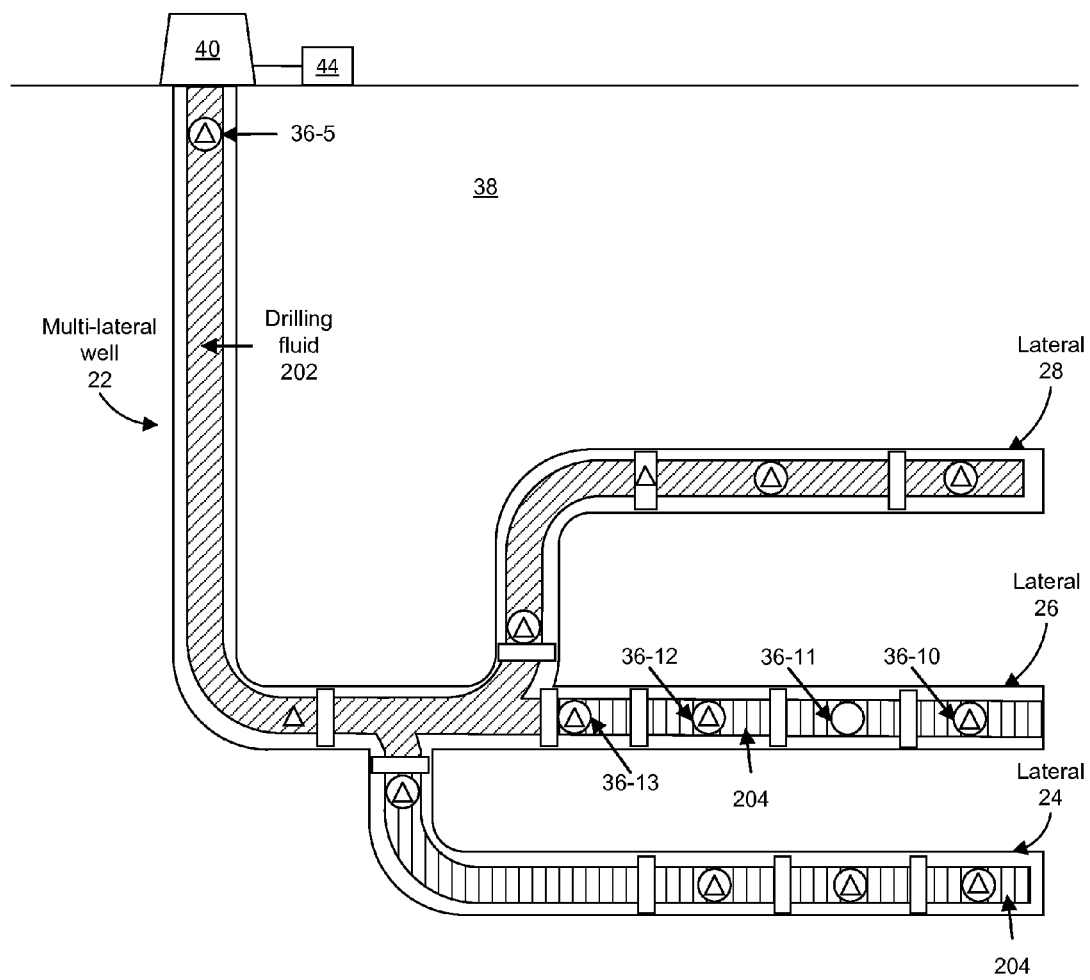
FIG. 4 illustrates a conceptual, schematic view of the multi-lateral well with the cleanup operation for a second lateral complete.

As seen in FIG. 4, the process may continue with removal of the drilling fluid 202 from the lateral 26. The flow control devices 36-10, 36-11, 36-12, and 36-5 may be opened to permit flow of fluid from the lateral 26 out the multi-lateral well 22. As above, the progress of the drilling fluid 202 out of the lateral 26 may be monitored by a user, a computing system, or both in real time. Once a change in composition of the fluid within the lateral 26 is detected, the flow of the fluid for that section may be stopped.

Figure 5:
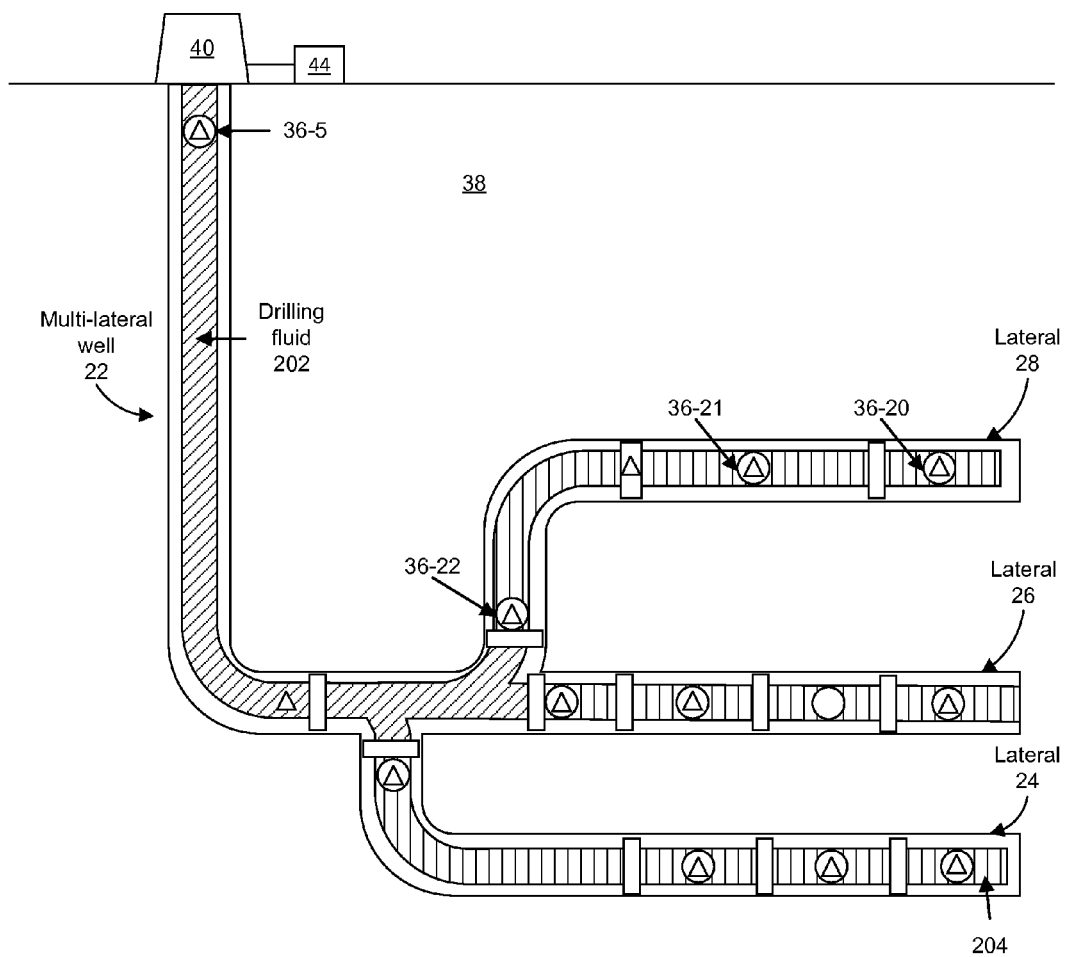
FIG. 5 illustrates a conceptual, schematic view of the multi-lateral well with the cleanup operation for a third lateral complete.

As seen in FIG. 5, the process may proceed with production of the drilling fluid 202 from the lateral 28. As above, in response to a change in composition of the fluid, the flow control devices 36-20, 36-21, and 36-22 may be opened and associated sensors may monitor the composition of the fluid produced from the lateral 28. When the drilling fluid 202 is recovered from the lateral 28, the drilling fluid 202 may be recovered from the main bore such that the drilling fluid 202 is removed from the multi-lateral well 22. As above, the sensors may generate data about the composition of the fluid, the volume of fluid, and others to allow a user to supervise the progress of the cleanup of lateral 28 and through the main bore once the laterals are cleaned.

In certain embodiments, the drilling fluid 202 is produced and stored in a reservoir for the drilling fluid 202. Once the drilling fluid 202 is removed from the multi-lateral well 22, the multi-lateral well 22 may be connected to a production network. At that time, the production fluid 204 may be produced from the multi-lateral well 22.

Figure 6:
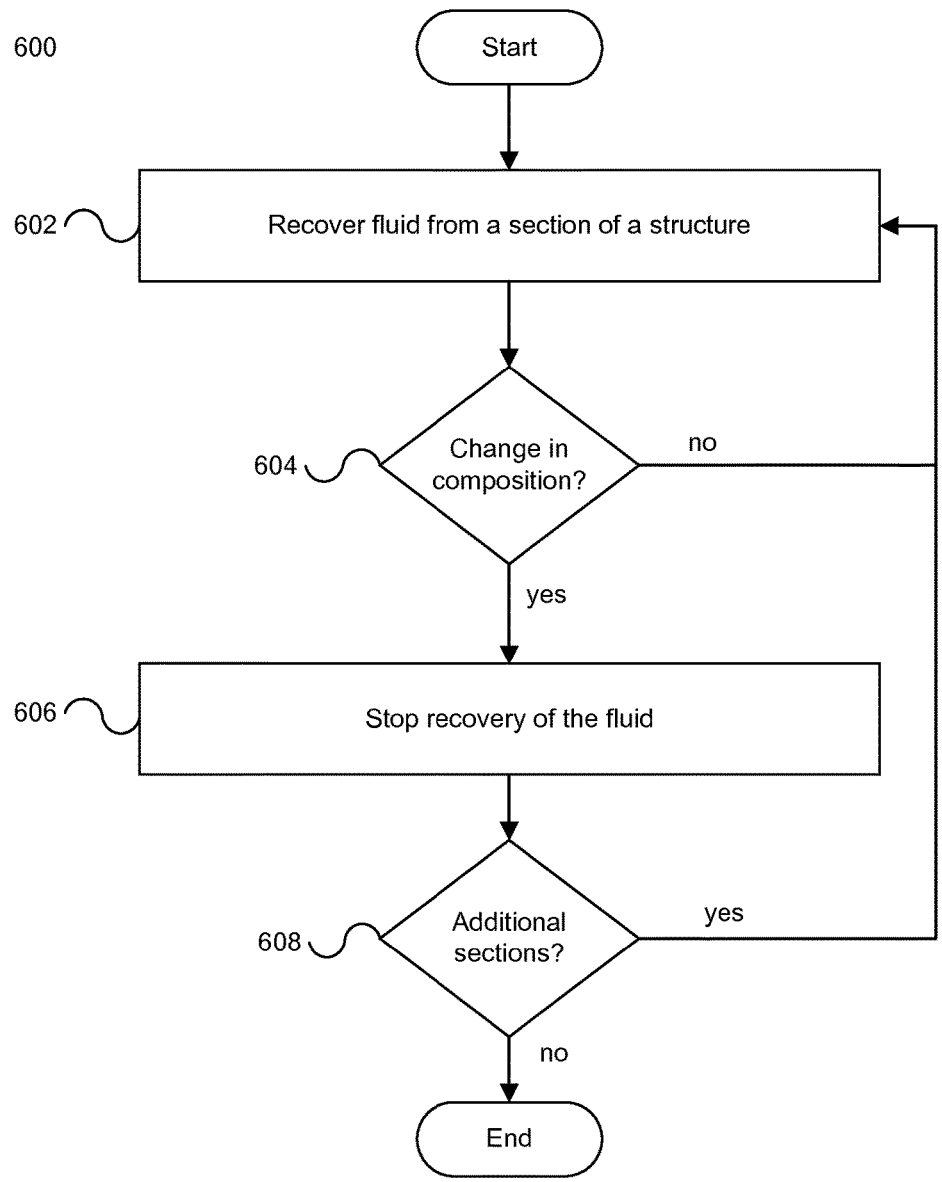
FIG. 6 illustrates a flowchart of a method for recovering fluid from a well.

FIG. 6 illustrates one embodiment of a method 600 for recovering fluid from a structure. The method 600 may begin with recovering 602 a fluid from a section of the structure. In one embodiment, the structure is a well. The method may also involve determining 604 whether there is a change in the composition for the fluid for the section. For example, a sensor may be located within the section. The sensor may monitor the fluid for the section and determine whether or not there is a change in composition at the location of the sensor within the section. For example, where the structure is a well, the sensor may sense a transition from a treatment fluid (such as drilling fluid) to another fluid (such as produced fluids). In certain embodiments, the section may include multiple sensors that monitor the composition of the fluid at multiple locations within the section. In certain embodiments, the sensors send data representing the physical properties they sense to a computing device. These data values may be stored and analyzed.

If there is no change in the composition, the method 600 may continue with recovering the fluid from the section. If there is a change in the composition, the method 600 may continue with stopping 606 the recovery of the fluid. In an embodiment where the structure is a well, the recovery may be stopped upon detection of the change in composition from a first fluid to hydrocarbons; in other embodiments, the recovery may be stopped after passage of an amount of time following detection of the change in composition. Such an embodiment may allow sufficient time to pass for the fluid to flow from the sensor to a flow control device that isolates a section such that the section is substantially free of the fluid being removed (e.g., drilling fluid). Stopping the recovery of the fluid may involve closing a flow control device.

The method 600 may continue with determining 608 whether there are additional sections in the structure with fluid to be recovered. For example, in a multi-lateral well, there may be multiple laterals that constitute separate sections. The method may repeat for each lateral of the multi-lateral well. Even wells without multiple laterals may have multiple sections, for which the process described in connection with FIG. 6 can iterate. The method may continue until fluid has been recovered from each section of the structure.

Figure 7:
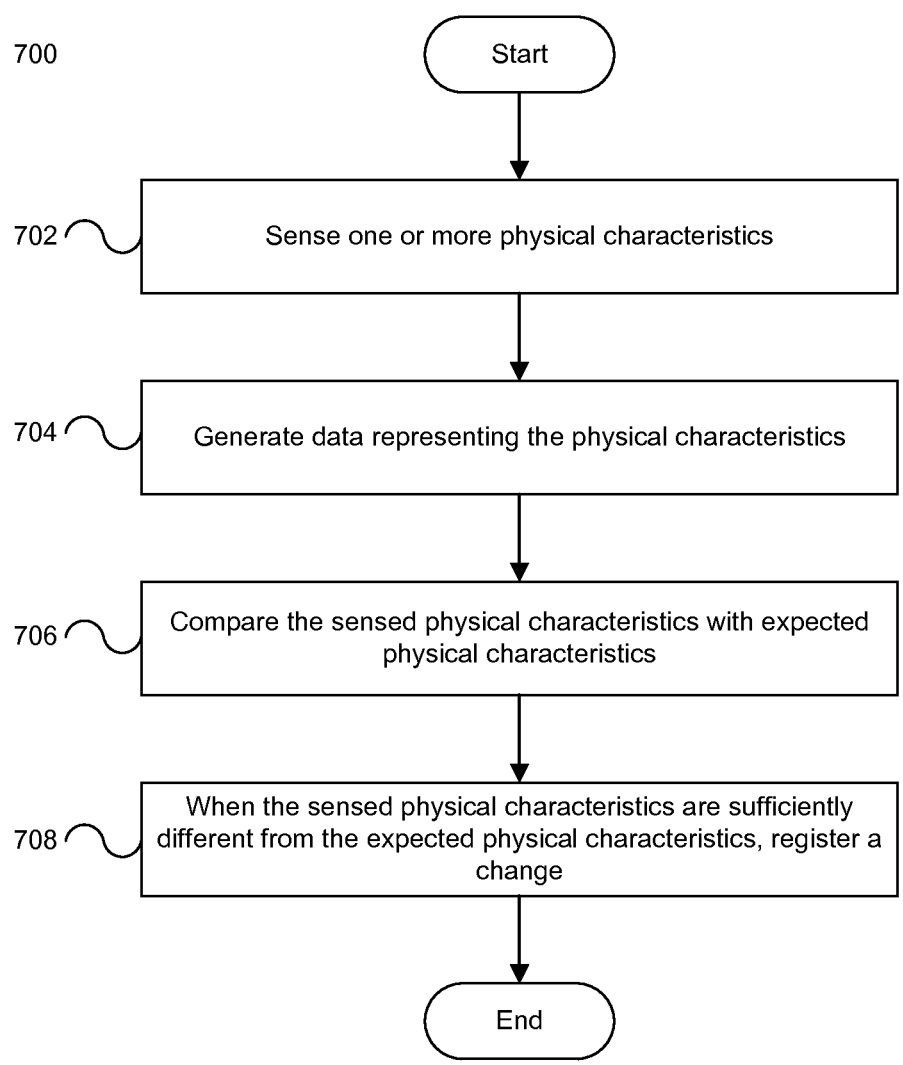
FIG. 7 illustrates a flowchart of a method for determining if a change in composition of a fluid has occurred.

FIG. 7 illustrates one method 700 for determining a change in composition of a fluid. The method 700 may involve sensing 702 one or more physical characteristics of the fluid. For example, the sensors may sense the water cut, gas/oil ratio, and other physical properties related to the physical composition of the fluid. The method 700 may also involve generating 704 data (such as real time data) representing the physical characteristics. The data may be transmitted to a computing device outside the multi-lateral well.

The method 700 may involve comparing 706 the sensed physical characteristics with expected physical characteristics. For example, a computing device may store a set of parameters characteristic of a drilling fluid. As the data is received, the computing device may compare the sensed physical characteristics (represented by the data) with the values representing the expected characteristics. When the sensed physical characteristics are sufficiently different from the expected physical characteristics to be indicative of a change in composition, the method may involve registering 708 a change.

In certain embodiments, average values of the real time data are compared with the expected physical characteristics. For example, average values of the data over a one-minute period may be compared to the expected physical characteristics of a fluid. Similarly, the comparisons may occur at regular intervals.

In certain embodiments, the computing device may be tuned to monitor for a particular change. For example, the computing device may monitor for a change from a drilling fluid to a production fluid. In other embodiments, the computing device may monitor for a less defined change. For example, the computing device may monitor for a change from a drilling fluid to some other fluid (such as water, oil, etc). In such an embodiment, the computing device may compare the data representative of the composition with expected physical characteristics of a drilling fluid. When the data no longer sufficiently corresponds to drilling fluid, the computing device may determine that a change in composition has occurred.

Figure 8:
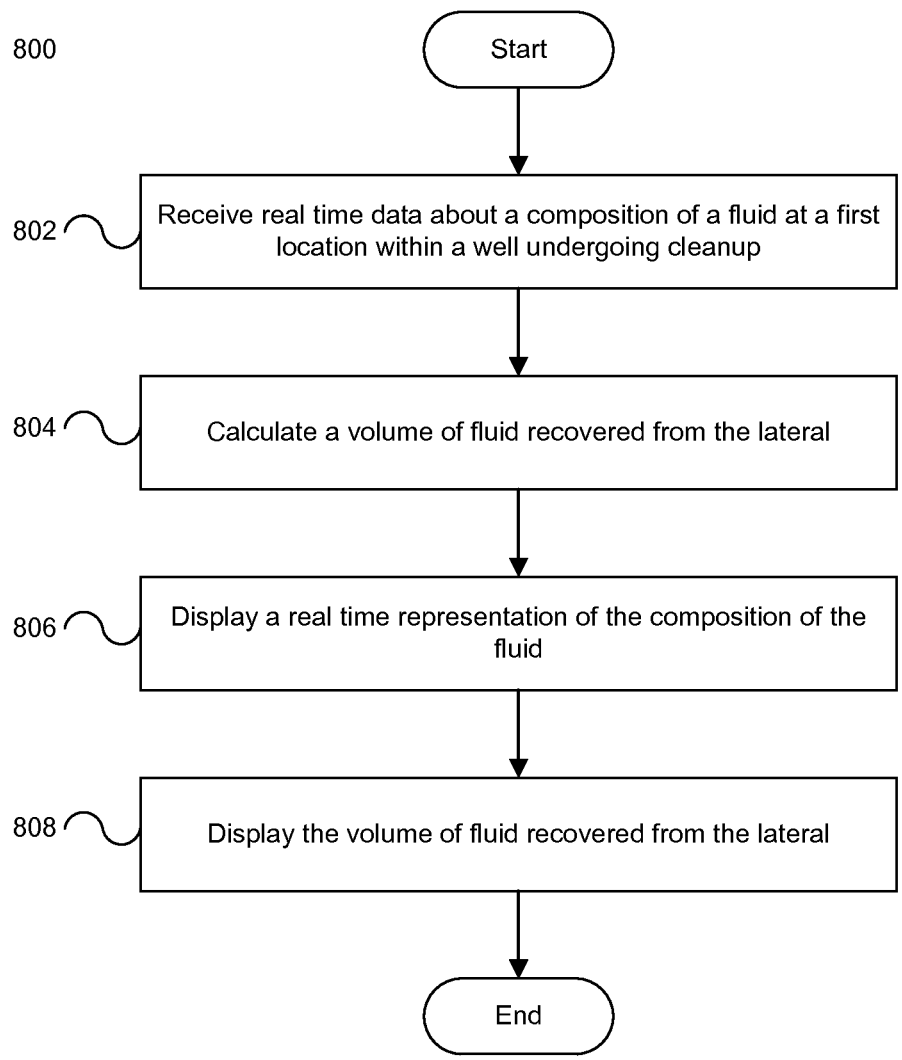
FIG. 8 illustrates a flowchart of a method for displaying real time information about the progress of a cleanup operation.

FIG. 8 illustrates an example of a method 800 for a computing device involved in a well cleanup operation. The computing device may receive 802 data about the composition of a fluid at a first subterranean location within a lateral of a multi-lateral well. The multi-lateral well may be undergoing a cleanup operation during which treatment fluids are returned. The term "cleanup operation" refers broadly to a period of production during which non-production fluids (such as drilling fluids, treatment fluids, etc.) are recovered from the well. The method 804 may also involve calculating the volume of fluid recovered from the lateral during the cleanup operation. The calculation may be based on data for the lateral, such as the flow rate.

The method 800 may further involve displaying 806 a representation of the composition of the fluid that is at the subterranean location on a display. The representation may be based on the data received from sensors at the subterranean location. The computing device may further display 808 the volume of fluid recovered from the lateral during the cleanup operation. A user of the computing device may use the information about the composition of the fluid and about the volume of fluid recovered to monitor the progress of the cleanup operation. The user may also make decisions (for example, when to stop flow from a certain section) based on the information.

In certain embodiments, the computing device is also configured to send an instruction to close a flow control device at the subterranean location. The instruction may be sent to the flow control device, and the flow control device may receive the instruction from the computing device and respond by stopping the flow. The computing device may send the instruction in response to a user command.

In certain embodiments, the computing device is configured to automatically determine the composition of the fluid at the subterranean location based on the data. If the computing device determines that the composition of the fluid has changed such that a different fluid is being sensed, the computing device may send the instruction in response to the change in composition. In certain embodiments, the computing device may also base the decision upon the amount of fluid recovered. For example, the computing device may have an estimate of how much treatment fluid is within the lateral. If the amount of treatment fluid recovered from the lateral is sufficiently close to the estimate (for example, within 5%-10%) and a change in composition is detected, the computing device may send the instruction to close the flow control device.

A well with multiple sections may include sensors for at least some of the sections. In such wells, the method 800 may be executed for each section that includes sensors. The method 800 may be executed sequentially for each section; for example, the method 800 may be applied for a first lateral and, once the method 800 is completed, the method 800 may begin in connection with a second lateral. In other embodiments, the method 800 may be executed in parallel; for example, two laterals of a multi-lateral well may undergo a cleanup operation as described herein at the same time.

Figure 9:
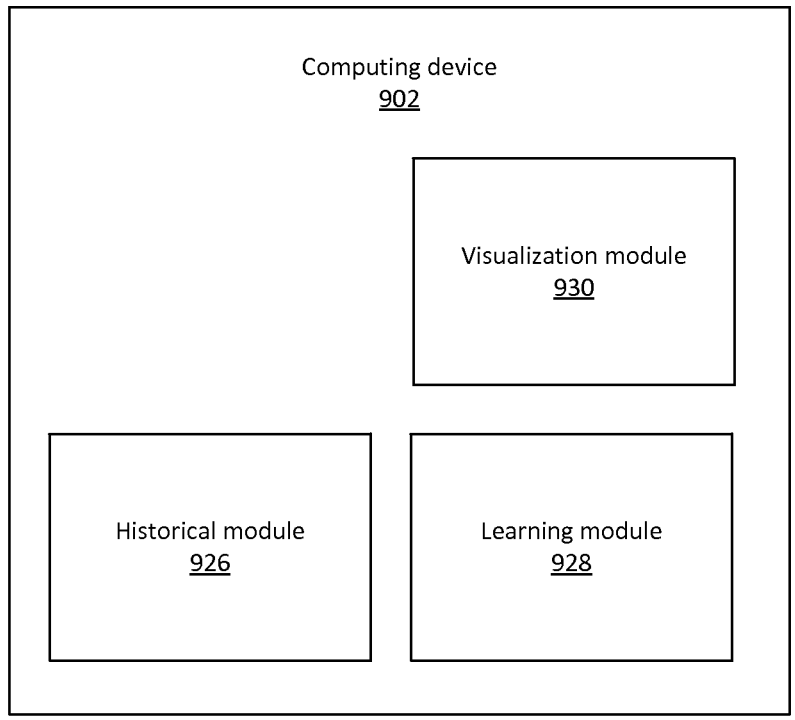
FIG. 9 illustrates a conceptual, schematic view of a computing device and a data store containing historical cleanup data.
Figure 9:
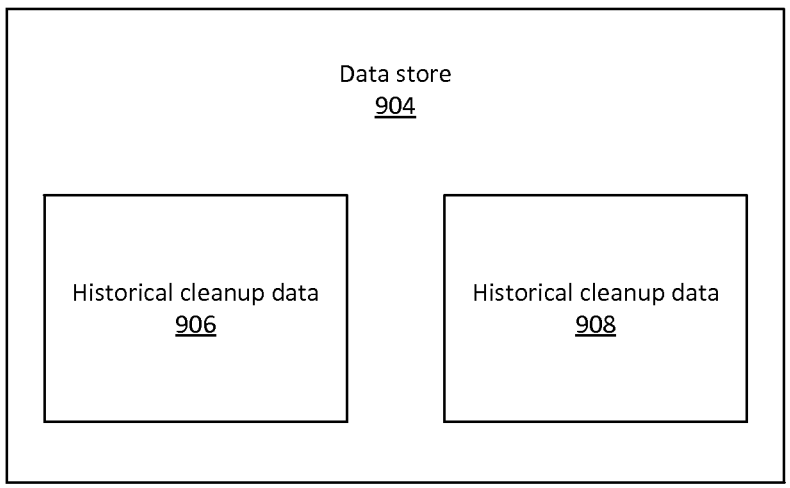

FIG. 9 illustrates one embodiment of a system that includes a computing device 902 and a data store 904. The data store 904 is a component for storing data and may be a database, flat file, or other suitable storage structure implemented on a storage medium. The computing device 902 may include a historical module 926 and a learning module 928.

The historical module 926 generates historical cleanup data 906 and 908. In one embodiment, during a cleanup operation, data from the sensors is received by the historical module 926 and stored in a data store 904 as historical cleanup data 906 and 908. In one embodiment, the historical module 926 stores the values measured by the sensors and the time at which the measurement was taken as historical cleanup data 906 and 908. The historical module 926 may also associate additional data, such as metadata, with the historical cleanup data 906 and 908. For example, the historical module 926 may associate a location, a project name, a data, an operator, or other data with the historical cleanup data 906 and 908. The historical module 926 may also associate the data with other related metadata such as information about the well's surrounding formations. For example, in one embodiment, the historical module 926 may associate the historical cleanup data 906 and 908 with the associated reservoir models.

The computing device 902 may also include a visualization module 930. The visualization module 930 may create visualizations of the data from the sensors such as those shown in FIGS. 10-14. In one embodiment, the historical module 926 may also be configured to allow playback of the historical cleanup data 906. The historical module 926 may stream the historical cleanup data 906 to the visualization module 930. In response, the visualization module 930 may display the historical cleanup data 906 as it is received. In such embodiments, the historical module 926 may allow the user to view how a particular cleanup operation associated with the historical cleanup data 906 proceeded. The historical module 926 may also provide the user with the ability to skip to a particular time in the historical cleanup data 906, increase or decrease the speed at which the visualization of the historical cleanup data 906 occurs, or other.

The computing device 902 may also include a learning module 928. The learning module 928 may analyze historical cleanup data 906, 908 and develop recommendations for future cleanup operations. In one embodiment, the learning module 928 involves an artificial neural network (ANN) that is trained using the historical cleanup data 906, 908.

In one embodiment, the learning module 928 receives historical cleanup data 906,908 that includes data representing measurements taken by the sensors. The learning module 928 may also receive data representing actions taken by an operator and a time of the action. For example, the data may represent an instruction sent by an operator to reduce the flow at a particular flow control device. The data may represent a designation by an operator that a cleanup operation for a particular section of a multi-section well is complete. In certain embodiments, the learning module 928 may receive information representing a rating for the effectiveness of a particular cleanup operation.

In one embodiment, the learning module 928 is trained using historical cleanup data 906,908 for cleanup operations with an acceptable effectiveness rating. The learning module 928 may also be trained using historical cleanup data 906, 908 with an unacceptable effectiveness rating; in such embodiments, the learning module 928 may be instructed to treat such historical cleanup data 906, 908 as examples of poorly executed cleanup operations.

The learning module 928 may consider the information about the composition of a fluid in a certain section at the time the decision is made to stop flow for that section to learn when to close, or when to recommend closing, a flow control device. In one embodiment, the learning module 928 uses the historical cleanup data 906, 908, to learn when the composition has sufficiently changed sufficiently to recommend stopping flow.

In certain embodiments, the historical cleanup data 906, 908 also includes information about the structure of the well. For example, the historical cleanup data 906, 908 may include information about the structure of the well such as the number of laterals, the depths and lengths of the laterals, the positions of the sensors and equipment within the well, etc. In one embodiment, the learning module 928 is configured to compare the structures of the wells in the historical cleanup data 906, 908 and compare the structures of the structure of the well currently undergoing a cleanup operation. The learning module 928 may designate the historical cleanup data 906, 908 for wells with structures similar to that of the well undergoing cleanup as more relevant than the historical cleanup data 906, 908 for wells with dissimilar structures. The learning module 928 may also have access to information about the surrounding formation associated with the historical cleanup data 906, 908. The learning module 928 may designate the historical cleanup data 906, 908 for wells in formations similar to the formation for the well undergoing cleanup as more relevant.

For example, a well undergoing a cleanup operation may have a lateral with a length x and sensors at locations a, b, and c within the lateral. The learning module 928 may identify historical cleanup data 906, 908 associated with wells having a comparable length and sensors at comparable locations. The learning module 928 may consider the progress of the cleanup operation in the identified historical cleanup data 906, 908 to estimate the amount of time necessary to complete the cleanup operation for the lateral. The learning module 928 may determine, based on the identified historical cleanup data 906, 908, what sensors readings are indicative of a change in composition, when the drilling fluid has been removed, etc.

The learning module 928 may also monitor the progress of the cleanup operations and provide recommendations as the cleanup operation progresses based on the historical cleanup data 906, 908. For example, the learning module 928 may monitor the fluid composition at a particular and the recovered volume from a particular lateral in real time. The learning module 928 may determine, based on the real time data about the composition, the recovered volume, and the historical cleanup data 906, 908 that a treatment fluid from a particular section has been recovered. The learning module 928 may notify the user that the user should adjust a flow control device to stop flow for the section. The learning module may notify the user through an email, a message displayed in a GUI, a text message, or other appropriate notification.

To continue the example above, the learning module 928 may determine that during a successful cleanup operation for a comparable lateral, the operator stopped the flow at time n when the sensors measured a composition with a particular oil-gas-water ratio. The learning module 928 may, at time n, determine that the current composition has a oil-gas-water ratio within 5% of the oil-gas-water ratio in the comparable lateral, as stored in the historical cleanup data 906, 908. The learning module 928, based on the similarity, may recommend that the operator stop the flow in the current cleanup operation. In other embodiments, the learning module 928 may automatically send a command to stop the flow without operator involvement in response to the similarity.

Figure 10:
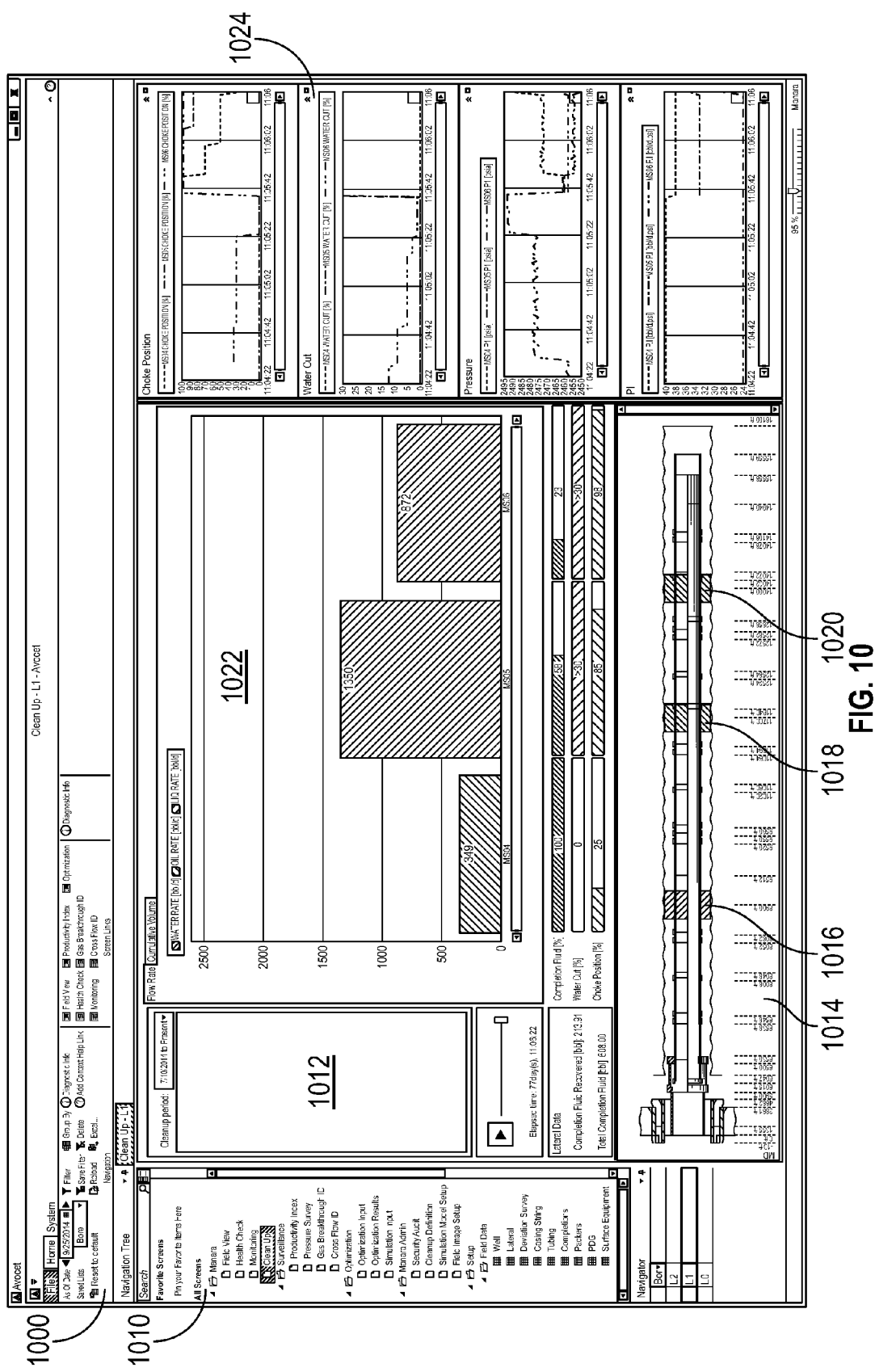
FIG. 10 illustrates a conceptual, schematic view of a GUI for monitoring progress of a cleanup operation.

FIG. 10 illustrates one embodiment of a GUI 1000 that may be displayed on a display to provide a user with information about an operation to remove a fluid from a structure such as a multi-lateral well. The GUI 1000 may include a navigation tree 1010. The navigation tree 1010 may allow a user to navigate multiple projects, various items and actions within a project, or other. In the FIG. 10, the navigation tree 1010 indicates that the computing system is presenting information relating to a cleanup operation.

The computing device may also present a history pane 1012. The computing device 1012 may present information about previous cleanup operations and allow the user to select previous cleanup operations from the history pane 1012. In certain embodiments, the history pane 1012 allows a user to direct the computing device to replay a cleanup operation. In such embodiments, the GUI 1000 may display data relevant to the selected historical cleanup operation, as opposed to real time cleanup data, in the GUI 1000.

The computing device may also display a representation 1014 of a section of the well under consideration. In FIG. 10, the representation 1014 is of a first lateral of the well undergoing the cleanup operation. The graphical representation 1014 may also include information about the section, such as the depth data shown in FIG. 10. The graphical representation 1014 may also include a graphic of the components and/or the sensors generating the data. In FIG. 10, the representation 1014 includes graphics 1016, 1018, and 1020 representing components with sensors generating real time data. The graphics may be positioned on the representation 1014 at positions corresponding to their actual locations within the well.

The GUI 1000 may also include a volume panel 1020 containing information about volumes of a fluid being recovered. In FIG. 10, the volume panel 1020 indicates the total completion fluid in oil barrels (bbl) and the completion fluid recovered in bbl. In certain embodiments, a party responsible for adding the fluid may provide the figure for the total completion fluid. For example, a drilling team may provide an estimate of the total completion fluid introduced into the well. The volume panel 1020 may also indicate the amount of fluid recovered during the cleanup operation. The computing device may dynamically update the reported value based on the real time data.

The computing device may also display a real time panel 1022 that includes real time data relating to the cleanup operation. In the displayed embodiment, the real time data (in FIG. 10, the flow rate) is displayed in the GUI above the sensor generating the real time data. Similarly, additional information for each sensor (such as the choke position, water cut, and completion fluid percentage) may also be displayed.

The computing device may also display a progress panel 1024 showing values for real time data over time. The progress panel 1024 may show the values over the time for the cleanup operation. In certain embodiments, each sensor is given a separate line in the graph (for example, a distinct color for each sensor) to display the real time values over the length of the cleanup operation.

In FIG. 10, the real time data indicates that the completion fluid has been cleaned from the first section associated with the graphic 1016 but the choke has not been shut yet. FIG. 10 illustrates that oil is being produced in the section associated with graphic 1016. The sensors associated with graphics 1018 and 1020 continue to indicate that completion fluid is being produced.

Figure 11:
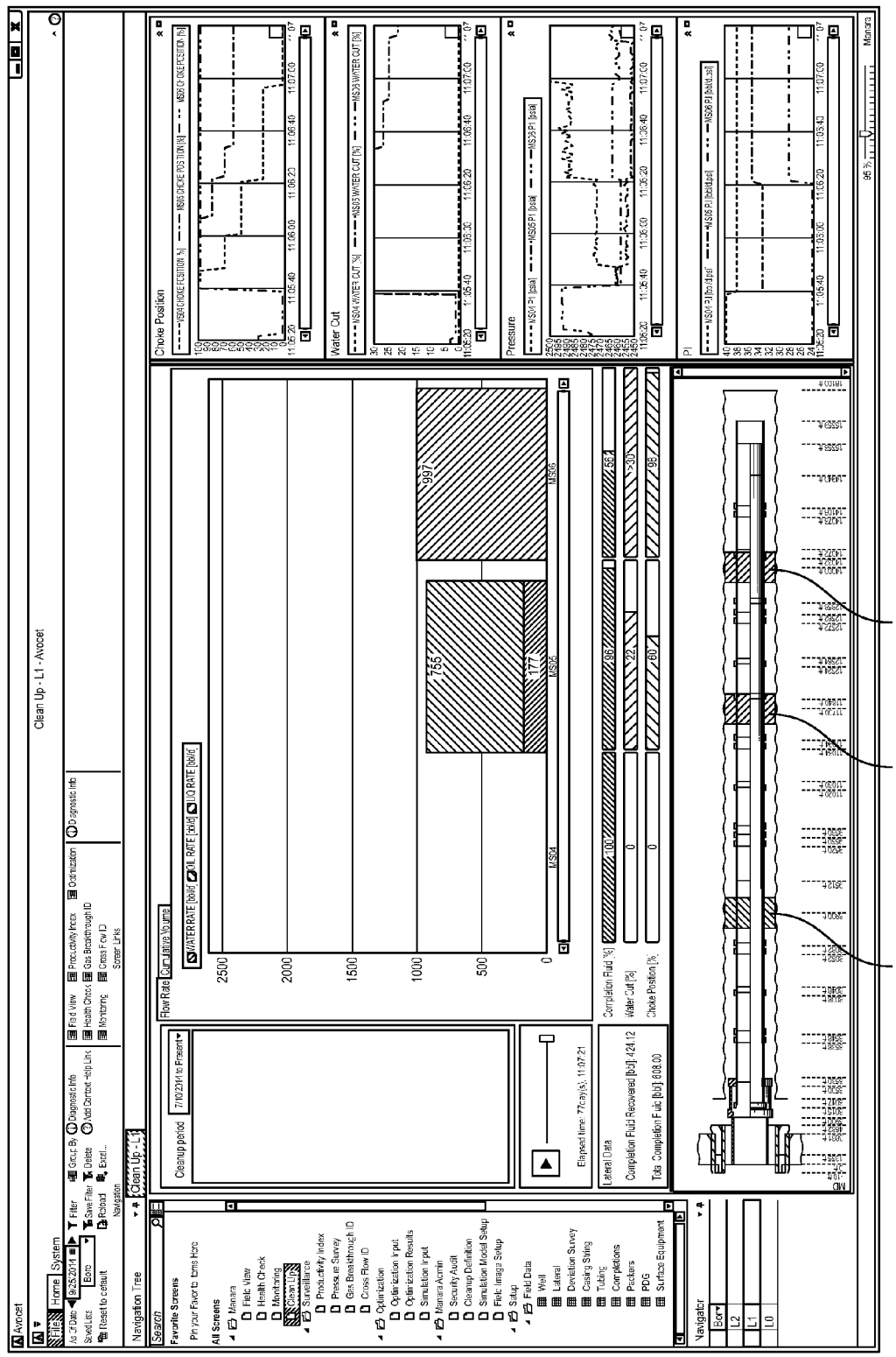
FIG. 11 illustrates a conceptual, schematic view of a GUI for monitoring progress of a cleanup operation with cleanup complete for a first section.

FIG. 11 illustrates a continued progression of the cleanup operation. In FIG. 11, the first section associated with graphic 1016 is closed as the cleanup for that section is complete. The section associated with graphic 1018 continues to progress. Based on the initial input values, such as the completion fluid estimate provided by a drilling team, the computing device estimates that the job is about 96% complete.

Figure 12:
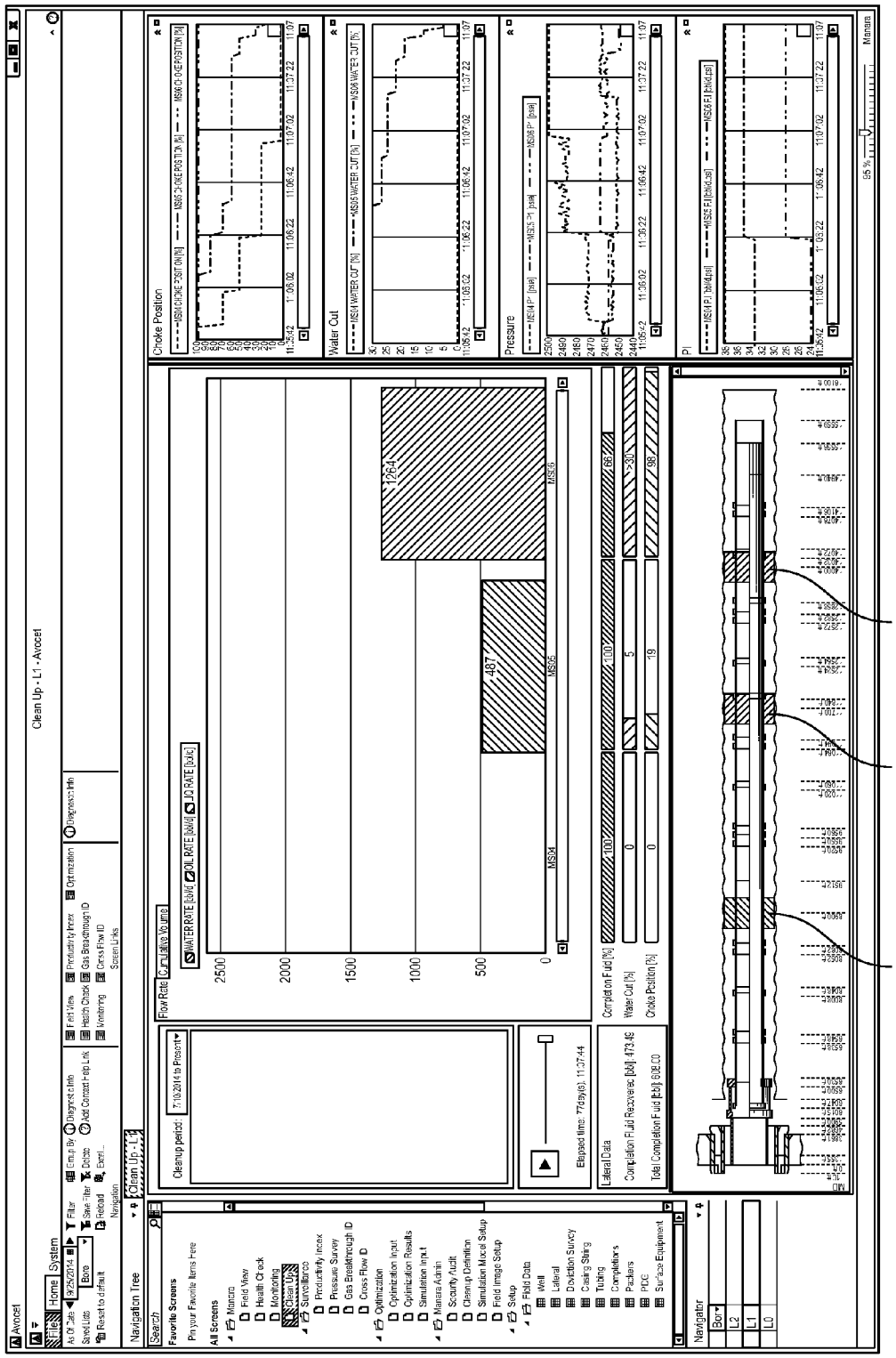
FIG. 12 illustrates a conceptual, schematic view of a GUI for monitoring progress of a cleanup operation with cleanup completing for a second section.
Figure 13:
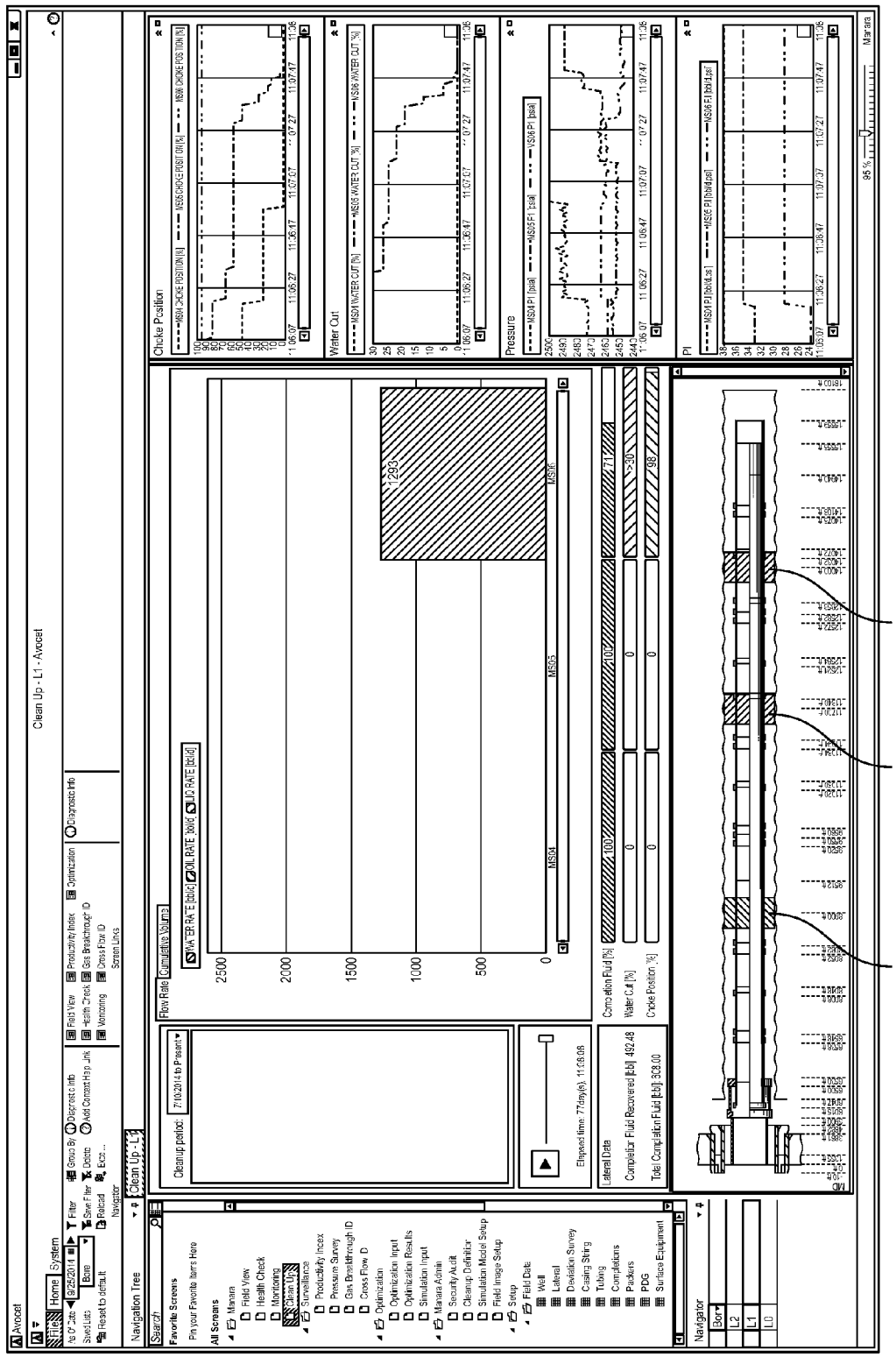
FIG. 13 illustrates a conceptual, schematic view of a GUI for monitoring progress of a cleanup operation with cleanup complete for the second section.
Figure 14:
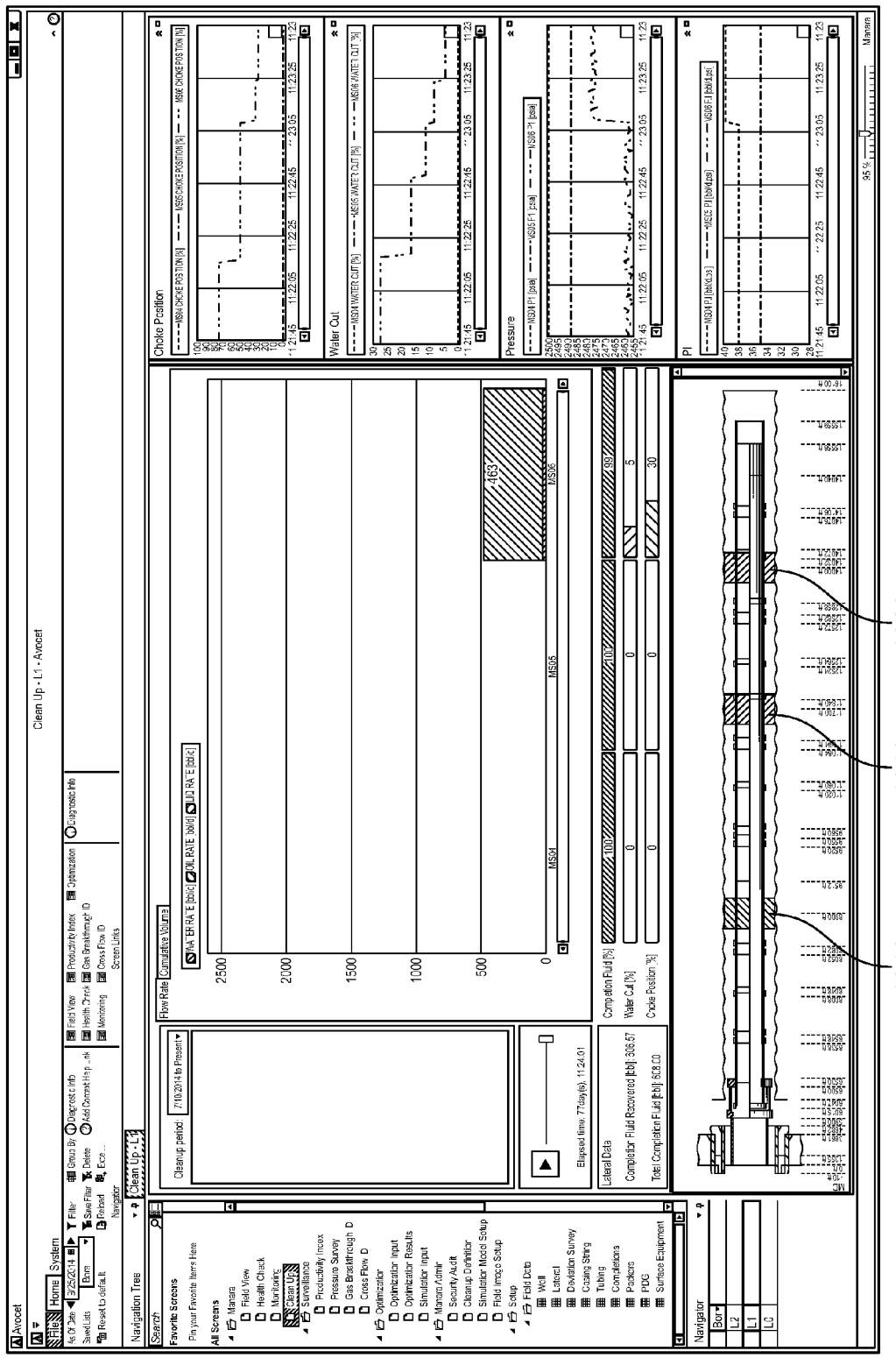
FIG. 14 illustrates a conceptual, schematic view of a GUI for monitoring progress of a cleanup operation with cleanup completing for a third section.

In the embodiment shown in FIG. 12, the cleanup process continues and the second section associated with graphic 1018 appears to be complete. With the choke of the associated flow control device open, oil is being produced. FIG. 13 illustrates flow being stopped for the second section and recovery continuing for the third section associated with graphic 1020. In FIG. 14, the fluid recovered from the third section transitions to oil, indicating that the drilling fluid has been recovered from the third section and completion of the cleanup operation. In response, the computing device, or a user, may close the choke associated with the flow control device for the third section to end the cleanup operation.

Figure 15:
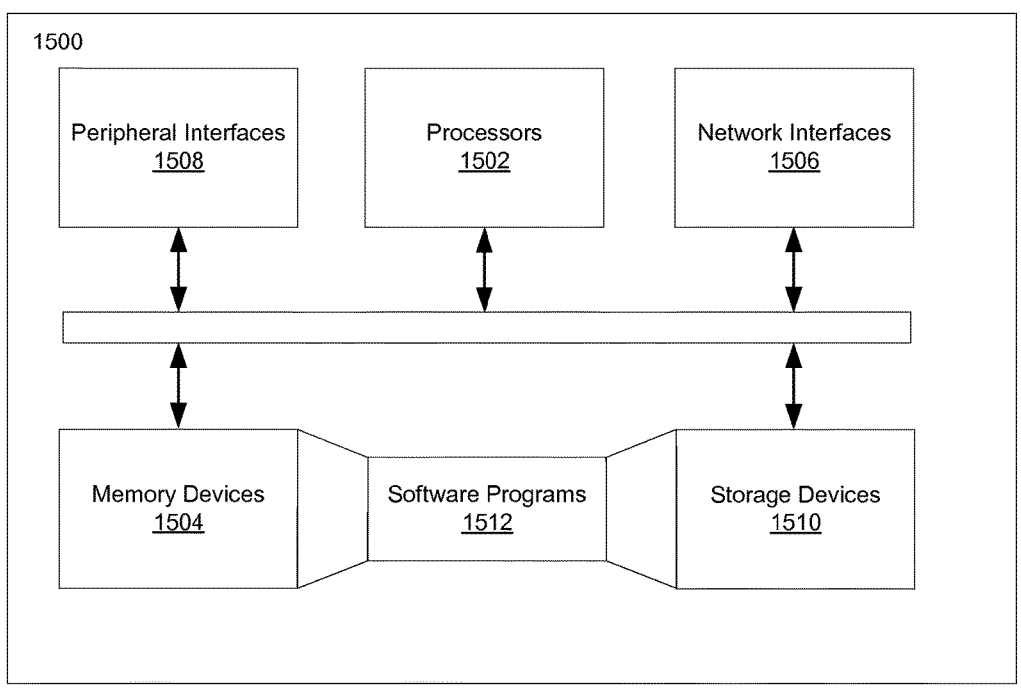
FIG. 15 illustrates a schematic view of a processor system.

Embodiments of the disclosure may also include one or more systems for implementing one or more embodiments of the method for cleanup operations. FIG. 15 illustrates a schematic view of such a computing or processor system 1500, according to an embodiment. The processor system 1500 may include one or more processors 1502 of varying core configurations (including multiple cores) and clock frequencies. The one or more processors 1502 may be operable to execute instructions, apply logic, etc. It will be appreciated that these functions may be provided by multiple processors or multiple cores on a single chip operating in parallel and/or communicably linked together. In at least one embodiment, the one or more processors 1502 may be or include one or more GPUs.

The processor system 1500 may also include a memory system, which may be or include one or more memory devices and/or computer-readable media 1504 of varying physical dimensions, accessibility, storage capacities, etc. such as flash drives, hard drives, disks, random access memory, etc., for storing data, such as images, files, and program instructions for execution by the processor 1502. In an embodiment, the computer-readable media 1504 may store instructions that, when executed by the processor 1502, are configured to cause the processor system 1500 to perform operations. For example, execution of such instructions may cause the processor system 1500 to implement one or more portions and/or embodiments of the method(s) described above.

The processor system 1500 may also include one or more network interfaces 1506. The network interfaces 1506 may include any hardware, applications, and/or other software. Accordingly, the network interfaces 1506 may include Ethernet adapters, wireless transceivers, PCI interfaces, and/or serial network components, for communicating over wired or wireless media using protocols, such as Ethernet, wireless Ethernet, etc.

As an example, the processor system 1500 may be a mobile device that includes one or more network interfaces for communication of information. For example, a mobile device may include a wireless network interface (e.g., operable via one or more IEEE 802.11 protocols, ETSI GSM, BLUETOOTH®, satellite, etc.). As an example, a mobile device may include components such as a main processor, memory, a display, display graphics circuitry (e.g., optionally including touch and gesture circuitry), a SIM slot, audio/video circuitry, motion processing circuitry (e.g., accelerometer, gyroscope), wireless LAN circuitry, smart card circuitry, transmitter circuitry, GPS circuitry, and a battery. As an example, a mobile device may be configured as a cell phone, a tablet, etc. As an example, a method may be implemented (e.g., wholly or in part) using a mobile device. As an example, a system may include one or more mobile devices.

The processor system 1500 may further include one or more peripheral interfaces 1508, for communication with a display, projector, keyboards, mice, touchpads, sensors, other types of input and/or output peripherals, and/or the like. In some implementations, the components of processor system 1500 are not enclosed within a single enclosure or even located in close proximity to one another, but in other implementations, the components and/or others may be provided in a single enclosure. As an example, a system may be a distributed environment, for example, a so-called "cloud" environment where various devices, components, etc. interact for purposes of data storage, communications, computing, etc. As an example, a method may be implemented in a distributed environment (e.g., wholly or in part as a cloud-based service).

As an example, information may be input from a display (e.g., a touchscreen), output to a display or both. As an example, information may be output to a projector, a laser device, a printer, etc. such that the information may be viewed. As an example, information may be output stereographically or holographically. As to a printer, consider a 2D or a 3D printer. As an example, a 3D printer may include one or more substances that can be output to construct a 3D object. For example, data may be provided to a 3D printer to construct a 3D representation of a subterranean formation. As an example, layers may be constructed in 3D (e.g., horizons, etc.), geobodies constructed in 3D, etc. As an example, holes, fractures, etc., may be constructed in 3D (e.g., as positive structures, as negative structures, etc.).

The memory device 1504 may be physically or logically arranged or configured to store data on one or more storage devices 1510. The storage device 1510 may include one or more file systems or databases in any suitable format. The storage device 1510 may also include one or more software programs 1512, which may contain interpretable or executable instructions for performing one or more of the disclosed processes. When requested by the processor 1502, one or more of the software programs 1512, or a portion thereof, may be loaded from the storage devices 1510 to the memory devices 1504 for execution by the processor 1502.

Those skilled in the art will appreciate that the above-described componentry is merely one example of a hardware configuration, as the processor system 1500 may include any type of hardware components, including any accompanying firmware or software, for performing the disclosed implementations. The processor system 1500 may also be implemented in part or in whole by electronic circuit components or processors, such as application-specific integrated circuits (ASICs) or field-programmable gate arrays (FPGAs).

The foregoing description of the present disclosure, along with its associated embodiments and examples, has been presented for purposes of illustration. It is not exhaustive and does not limit the present disclosure to the precise form disclosed. Those skilled in the art will appreciate from the foregoing description that modifications and variations are possible in light of the above teachings or may be acquired from practicing the disclosed embodiments.

For example, the same techniques described herein with reference to the processor system 1500 may be used to execute programs according to instructions received from another program or from another processor system altogether. Similarly, commands may be received, executed, and their output returned entirely within the processing and/or memory of the processor system 1500. Accordingly, neither a visual interface command terminal nor any terminal may be provided for performing the described embodiments.

Likewise, the methods described, in some embodiments, may not be performed in the same sequence discussed or with the same degree of separation. Various aspects may be omitted, repeated, combined, or divided, as appropriate to achieve the same or similar objectives or enhancements. Accordingly, the present disclosure is not limited to the above-described embodiments, but instead is defined by the appended claims in light of their full scope of equivalents. Further, in the above description and in the below claims, unless specified otherwise, the term "execute" and its variants are to be interpreted as pertaining to any operation of program code or instructions on a device, whether compiled, interpreted, or run using other techniques. In the claims that follow, section 112 paragraph sixth is not invoked unless the phrase "means for" is used.

What is claimed is:

1. A non-transitory computer-readable medium storing instructions that, when executed by a processor, cause the processor to perform operations, the operations comprising:
receiving data about a composition of a fluid at a first location within a section of a multi-section well undergoing a cleanup operation;

calculating a volume of fluid recovered from the section during the cleanup operation based on the data; and displaying a representation of the composition of the fluid at the first location based on the data;

displaying the volume of fluid recovered from the section during the cleanup operation; and based on the composition of the fluid, operating at least one flow control valve to change a flow of fluid at the section of the multi-section well.

2. The non-transitory computer-readable medium of claim 1, further comprising sending an instruction to close a flow control device at the first location.

3. The non-transitory computer-readable medium of claim 2, further comprising automatically determining the composition of the fluid at the first location.

4. The non-transitory computer-readable medium of claim 3, wherein the instruction is sent in response to determining the change in the composition.

5. The non-transitory computer-readable medium of claim 1, wherein the section of the multi-section well is a lateral in a multi-lateral well.

6. The non-transitory computer-readable medium of claim 1, further comprising operations for storing at least a portion of the data in a data storage device and associating the data with the cleanup operation.

7. The non-transitory computer-readable medium of claim 6, further comprising generating one or more recommendations for the cleanup operation from the data in the data storage device.

8. The non-transitory computer-readable medium of claim 1, further comprising operations for:

receiving data about a composition of a fluid at a second location within a lateral of a multi-lateral well undergoing a cleanup operation;

calculating a volume of fluid recovered from the lateral during the cleanup operation based on the data; and displaying a representation of the composition of the fluid at the second location based on the data; and displaying the volume of fluid recovered from the lateral during the cleanup operation.

9. The non-transitory computer-readable medium of claim 8, wherein the second location is within a second lateral of the well.

10. A system, comprising:

a plurality of sensors disposed within a well, each of the plurality of sensors configured to:

measure properties of a fluid at a location of the sensor, and generate real time data representing the properties;

a communications module for communicating the real time data to a computing system including:

one or more processors, a display, and a memory system comprising one or more non-transitory computer-readable media comprising instructions that, when executed by at least one of the one or more processors, cause the computing system to perform operations comprising:

receiving the real time data measured by the plurality of sensors;

monitoring, based at least in part on the real time data, a composition of the fluid at locations of the plurality of sensors;

displaying on the display information about the composition of the fluid at the locations of the plurality of sensors;

in response to detecting a change in the composition of the fluid at a particular location of a particular sensor, notifying a user of the change; and displaying information about a progress of a cleanup operation for the well; and a plurality of flow control devices, the operations further comprising stopping a flow of the fluid at the particular location associated with the particular sensor in response to detecting the change in the composition of the fluid at the particular location.

* * * * *